United States Patent [19]

Hamzi

[11] Patent Number: 5,288,234
[45] Date of Patent: Feb. 22, 1994

[54] DEVICE FOR COMPOSING AND DECOMPOSING CHORDS AND SCALES

[76] Inventor: Houari Hamzi, 2 Rue De La Concorde, 92600 Asniéres sur Seine, France

[21] Appl. No.: 15,304

[22] Filed: Feb. 9, 1993

Related U.S. Application Data

[63] Continuation-in-part of Ser. No. 817,588, Jan. 7, 1992, abandoned.

[51] Int. Cl.5 .................. G09B 25/00; G09B 15/02
[52] U.S. Cl. ........................ 434/404; 84/471 SR
[58] Field of Search ............... 434/404, 402; 84/471 SR, 485 SR

[56] References Cited

U.S. PATENT DOCUMENTS

| | | | |
|---|---|---|---|
| 3,592,099 | 7/1971 | Gibby | 84/473 |
| 3,841,192 | 10/1974 | Leonard | 84/485 |
| 3,842,708 | 10/1974 | Leonard | 84/485 |
| 4,074,607 | 2/1978 | Bond | 84/471 SR |
| 4,915,005 | 4/1990 | Shaffer et al. | 84/314 R |

FOREIGN PATENT DOCUMENTS 3744255 7/1989 Fed. Rep. of Germany ... 84/471 SR

*Primary Examiner*—John J. Wilson
*Assistant Examiner*—Cindy A. Cherichetti

[57] ABSTRACT

This invention consists of a device for composing, decomposing, retransposing and retranscribing all chords and scales contained in music. The device in question comprises two superimposed disks of different diameters, joined at their center by a pin enabling the disks to rotate independently. The twelve musical notes of the diatonic scale are written on the lower disk with the larger diameter. Intervals, interval qualifications, degrees of intervals and various indexed scales are written on the upper disk with the smaller diameter. Whatever the composition, decomposition, retransposition and retranscription information required for a given chord or scale, the user, by rotating the disks, matches the chosen note with the "FUNDAMENTAL" interval, on which all chord or scale building is based. This allows him to see the position, degree, interval and qualification of the other notes of the chord or scale. This device may be used for all diatonic, monophonic and polyphonic instruments.

7 Claims, 3 Drawing Sheets

DEVICE FOR COMPOSING AND DECOMPOSING CHORDS AND SCALES

This application is a continuation-in-part, of application Ser. No. 07/817588, filed Jan. 7, 1992, now abandoned.

BACKGROUND

Various methods currently exist to teach musical notation: written, computerized, audio or video. The disadvantage of computer, audio or video methods is that they require suitable electronic equipment. The major disadvantage of the written method, which is often cumbersome, is that it is confined to the rudiments of musical theory and that a teacher is needed to guide the student further. Devices also exist to learn an instrument, such as those presented in U.S. Pat. Nos. 3,841,192 and 3,842,708 which only refer to the piano and indicate the notes that each hand must play for predefined chords. As these devices only provide a small number of chords and only apply to a single instrument, they offer no significant progress over the methods that they aim to replace or complete. U.S. Pat. No. 4,074,607 outlines a process designed to simplify analysis of chords and musical notation according to a device based on progression by fifths which, far from simplifying musical theory, requires a thorough knowledge of musical notation to understand how it works.

This invention is aimed at everyone, including beginners, interested in learning musical notation and in playing a diatonic, monotonic or polyphonic instrument.

This invention consists in a device to compose, decompose, retranspose and retranscribe all musical chords and scales. It gives the intervals of a chosen note along with the qualifications and degrees of all other notes as well as the scales that can be played with the chosen note. The device comprises two superimposed disks of different diameters, joined at their centre by a pin enabling the disks to rotate independently.

BRIEF DESCRIPTION

Figure 1:
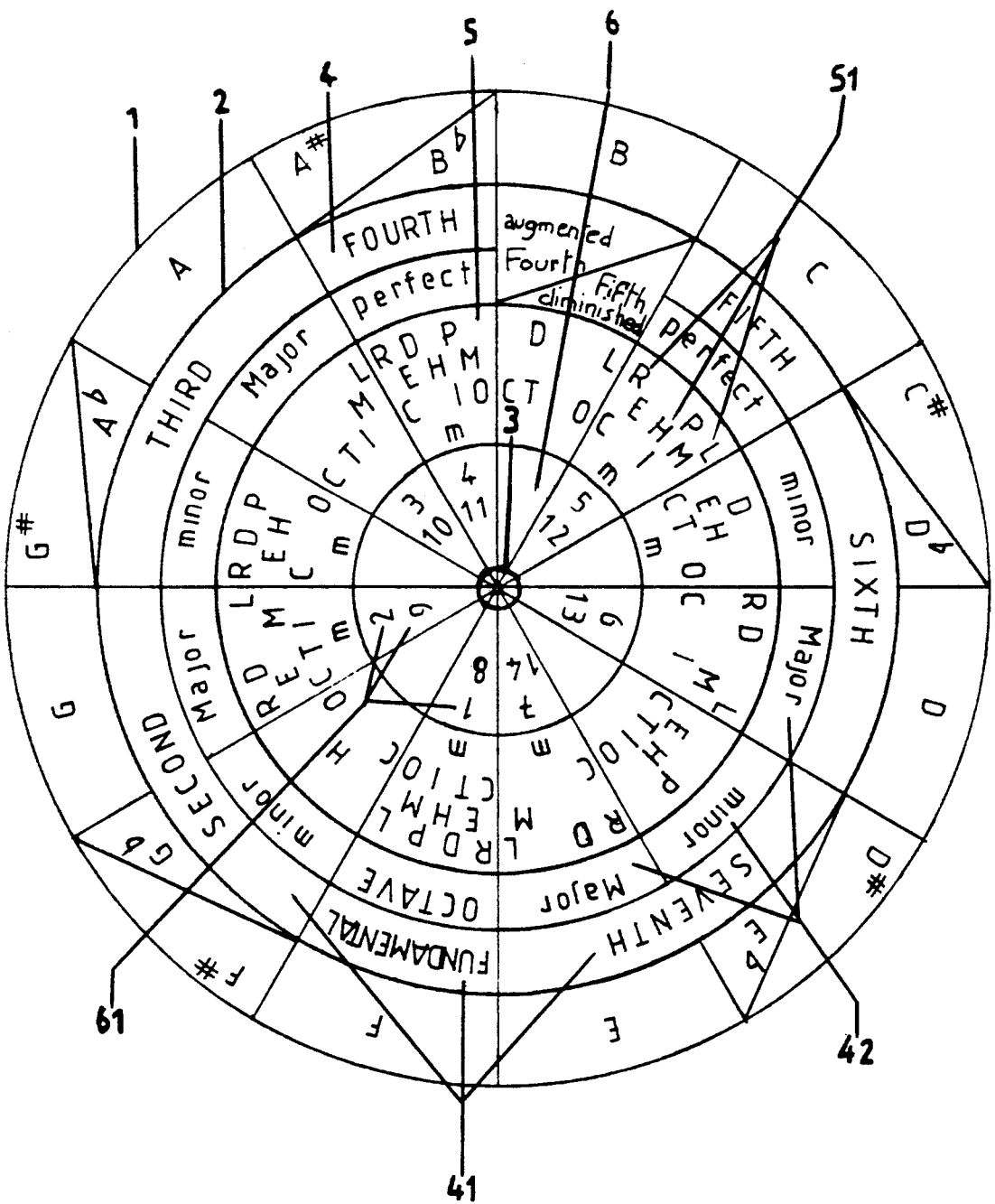
FIG. 1 illustrates the device with the musical note F positioned at the FUNDAMENTAL/OCTAVE mark.
Figure 2:
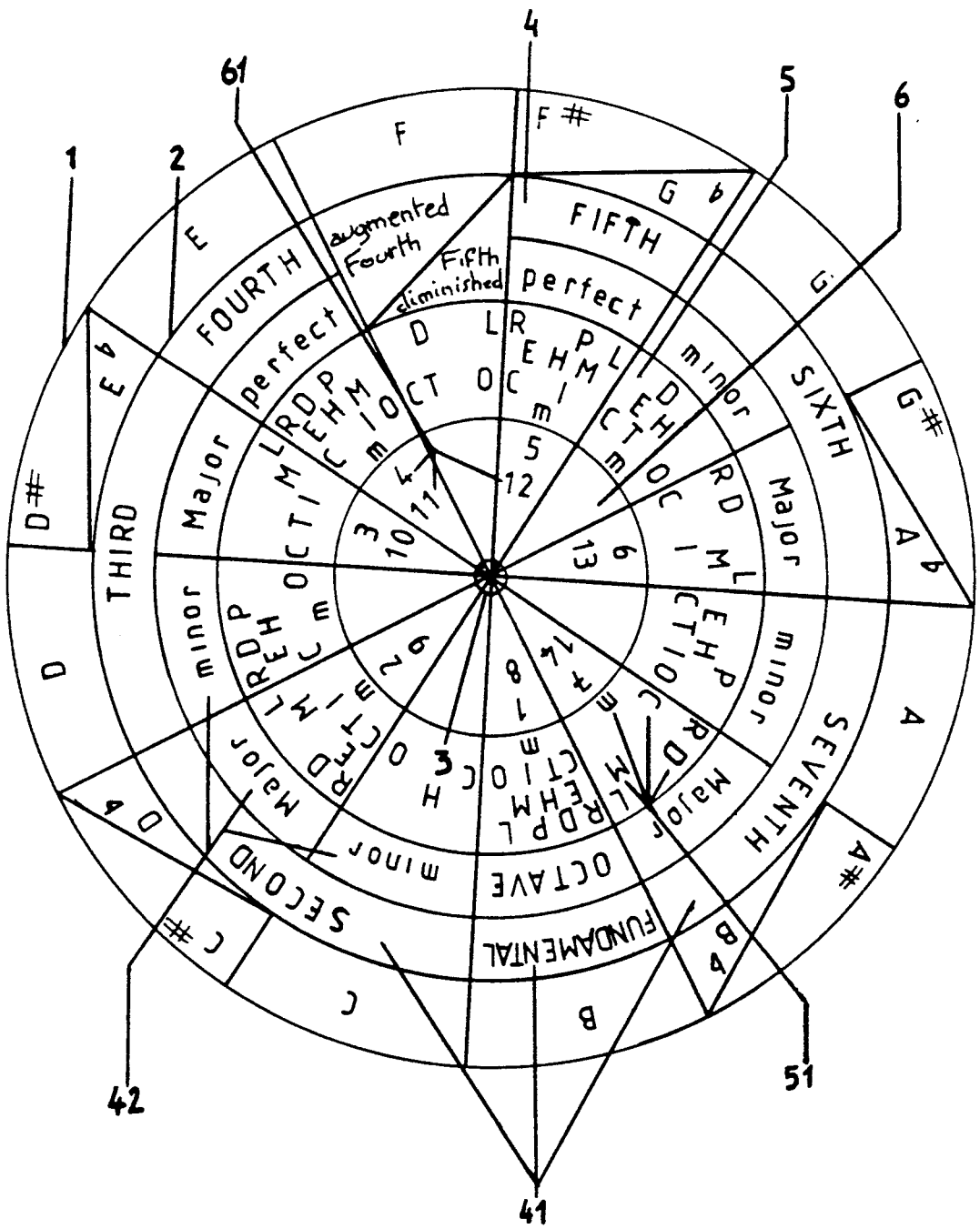
FIG. 2 illustrate the device with the musical note B positioned at the FUNDAMENTAL/OCTAVE mark.
Figure 3:
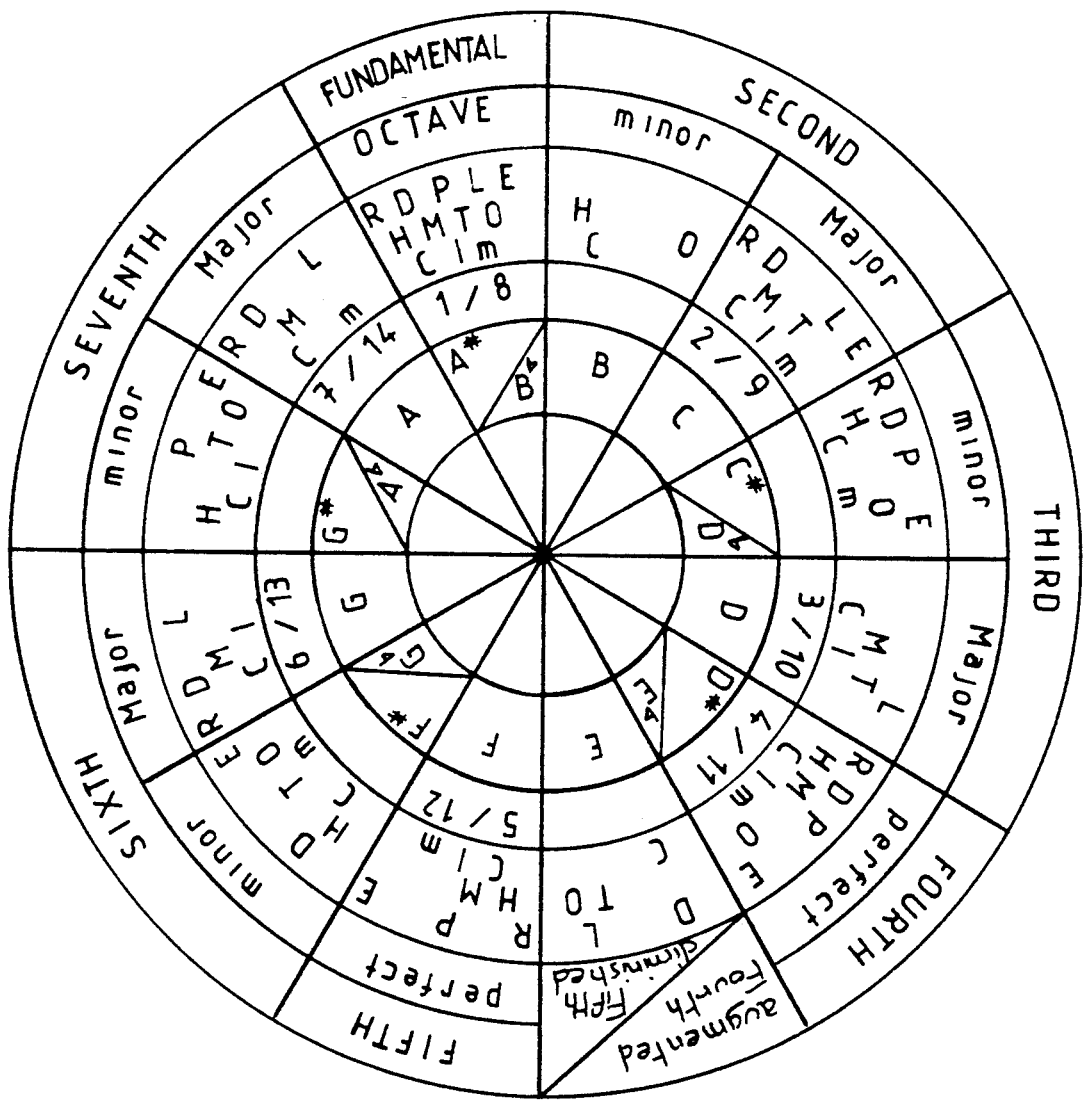
FIG. 3 illustrates another possible embodiment of the device.

This invention is based on the principle that there are twelve musical notes comprising the diatonic scale and that information on chords, scales and degrees corresponds to each of them.

This invention consists of two superimposed disks of different diameters and joined at their centre by a pin enabling the disks to rotate independently.

The lower disk has the larger diameter. The twelve musical notes of the diatonic scale are written from left to right and in sequence on the outer peripheral and fully visible edge of this disk.

The upper disk with the smaller diameter is marked with two concentric circles which divide the disk into three bands: an outer band, middle band and inner band.

The outer band of the upper disk is divided into eight segments: four segments each comprising two sub-segments and another four segments comprising a single sub-segment. On each segment the intervals are written in suitable order with their qualifications placed underneath in the sub-segments.

The intervals and their qualifications are as follows:

| FUNDAMENTAL/OCTAVE without qualification | |
|---|---|
| SECOND | groups the minor, Major qualifications |
| THIRD | groups the minor, Major qualifications |
| FOURTH | with the perfect qualification |
| Augmented qualified Fourth/Diminished qualified Fifth | |
| FIFTH | with the perfect qualification |
| SIXTH | groups the minor, Major qualifications |
| SEVENTH | groups the minor, Major qualifications |

The middle and inner bands are divided into twelve equal segments.

In the middle and inner band of each segment of the upper disk abbreviations concerning the scales are written in a logical order. The following scales are written in abbreviated form:

| | |
|---|---|
| M = Major scale (Ionian) | E = Aeolian scale |
| R = Dorian scale | H = Phrygian scale |
| P = Pentatonic scale | L = Lydian scale |
| C = Chromatic scale | I = Mixolydian scale |
| T = Tone by Tone scale | O = Locrian scale |
| D = Tone half-tone scale | m = Harmonic minor scale |

The abbreviations, arbitrarily chosen by the inventor for the sake of simplicity, provide markers which indicate the distance between notes in the same scale. This list is not exhaustive since other scales may be added.

In the inner band and inside each segment of the upper disk, the degrees of notes are written in suitable order. The degrees appear in a numerical sequence from 1 to 14.

To improve viewing and facilitate understanding of the device, the three bands of the upper disk are marked in different colours.

Since the FUNDAMENTAL/OCTAVE segment is the basic internal for all musical construction, whether chords or scales, it will be marked with a distinct colour to highlight this feature.

This invention is simple to use. For a chosen note, the user turns one of the disks to match the chosen note appearing on the lower disk with the FUNDAMENTAL/OCTAVE segment written on the outer band of the upper disk. In this way the other notes are aligned with information entered on the different bands written in the segments of the upper disk.

DESCRIPTION OF A PREFERRED EMBODIMENT

This invention consists of two superimposed disks (1) and (2) of different diameters and joined at their centre by a pin (3) enabling them to rotate independently.

The lower disk (1) has a larger diameter. The twelve musical notes of the diatonic scale are written from left to right and in sequence on its outer peripheral and fully visible edge, viz A; A#/Bb; B; C; C#/Db; D; D#/Eb; E; F; F#/Gb; G; G#/Ab.

The upper disk (2) with the smaller diameter features two concentric circles which divide the disk into three bands: an outer band (4), middle band (5) and inner band (6).

The outer band (4) of the upper disk is divided into eight segments: four segments each comprising two sub-segments and another four segments comprising a single sub-segment.

The intervals are written in each segment in suitable order with their qualifications placed underneath in the sub-segments.

The intervals (41) and their qualifications (42) are as follows:

| FUNDAMENTAL/OCTAVE without qualification | |
|---|---|
| SECOND | groups the minor, Major qualifications |
| THIRD | groups the minor, Major qualifications |
| FOURTH | with the perfect qualification |
| Augmented qualified Fourth/Diminished qualified Fifth | |
| FIFTH | with the perfect qualification |
| SIXTH | groups the minor, Major qualifications |
| SEVENTH | groups the minor, Major qualifications |

The middle and inner bands are divided into twelve equal segments.

In the middle band (5) and inside each segment of the upper disk, abbreviations (51) concerning the scales are written in logical order.

The following scales are written in abbreviated form:

| | |
|---|---|
| M = Major scale (Ionian) | E = Aeolian scale |
| R = Dorian scale | H = Phrygian scale |
| P = Pentatonic scale | L = Lydian scale |
| C = Chromatic scale | I = Mixolydian scale |
| T = Tone by Tone scale | O = Locrian scale |
| D = Tone half-tone scale | m = Harmonic minor scale |

These abbreviations, chosen arbitrarily by the inventor for the sake of simplicity, provide markers which indicate the distance between notes in the same scale.

This list is not exhaustive since other scales may be added.

In the inner band (6) and inside each segment of the upper disk, the degrees (61) of notes are written in suitable order. The degrees appear in a numerical sequence from 1 to 14.

To improve viewing and facilitate understanding of the device, the three bands of the upper disk are marked with different colours.

The FUNDAMENTAL/OCTAVE segment is the basic interval for all musical construction, whether chords or scales. This segment will be assigned a distinct colour to highlight this feature.

This invention is simple to use.

CHORD

To compose, decompose, retranspose or retranscribe a chord or scale from a chosen note, the user turns on the disks to match the chosen note appearing on the outer edge of the lower disk (1) with the FUNDAMENTAL/OCTAVE segment (42) of the outer edge of the upper disk (2). In this way all remaining notes are aligned with all information appearing on the other bands of the upper disk. As a result, each note of the lower disk corresponds to given information entered on the upper disk (2). Depending on his needs, the user will read either the outer band (4) to obtain information on chords or the middle band (5) to obtain information on a scale or the inner band (6) to discover the degree of one or more notes.

EXAMPLE 1

To discover what notes comprise the chord F Major 7 minor, the user matches the FUNDAMENTAL/OCTAVE segment (42) of the outer band (4) of the upper disk with note F marked on the outer edge of the lower disk (1).

The following matching information may then be read:

| F = | FUNDAMENTAL/OCTAVE |
|---|---|
| F#/Gb = | minor SECOND |
| G = | Major SECOND |
| G#/Ab = | minor THIRD |
| A = | Major THIRD |
| A#/Bb = | Perfect FOURTH |
| B = | Augmented Fourth/Diminished Fifth |
| C = | Perfect FIFTH |
| C#/Db = | minor SIXTH |
| D = | Major SIXTH |
| D#/Eb = | minor SEVENTH |
| E = | Major SEVENTH |

By extracting intervals which traditionally from a Major type chord with a minor seventh, i.e. FUNDAMENTAL/OCTAVE, Major qualified THIRD, Perfect qualified FIFTH and minor qualified SEVENTH, the following notes can be read:

| FUNDAMENTAL/OCTAVE = F |
|---|
| Major THIRD = A |
| Perfect FIFTH = C |
| minor SEVENTH = D#/Eb |

SCALE

To view the notes comprising a scale from a given note, the user matches the FUNDAMENTAL/OCTAVE segment (42) with the chosen note written on the outer edge of the lower disk (1). All other notes of the scales are then automatically matched with the abbreviations of scales in the middle band (5) of the upper disk (2). The user then reads off all notes matching the abbreviation of the chosen scale.

EXAMPLE 2

The user wishes to know what notes make up the Major scale of B. He matches the FUNDAMENTAL/OCTAVE (42) segment with note B written in the outer band of the lower disk (1). The other notes of the scale are then matched with the abbreviations M appearing in the middle band (5) of the upper disk (2), viz. B, C#/Db, D#/Eb, E, F#/Gb, G#/Ab, A#/Bb This invention may assume various embodiments. For example, the upper disk may have a smaller diameter and comprise the sequence of notes A; A#/Bb; B; C; C#/Db; D; D#/Eb; E; F; F#/Gb; G; G#/Ab written in the outer ring. The lower disk then has the larger diameter: two concentric circles are marked on the outside of the upper disk so as to divide it into three bands: one band comprising the sequence of intervals with their qualifications, another comprising the abbreviations concerning the scales and yet another comprising the numerical sequence from 1 to 14 concerning the degrees.

The band comprising the intervals and their qualifications is divided into eight segments spread as follows: four segments each comprising two sub-segments, the other four comprising a single sub-segment. The first segment comprises the FUNDAMENTAL interval and below the OCTAVE; the second segment comprises the SECOND interval grouping the minor/Major qualifications below and inside the sub-segment; the fourth segment comprises the FOURTH interval with the perfect qualification below and inside the sub-segment; the fifth segment comprises the FOURTH interval with the augmented qualification below and FIFTH interval with the diminished qualification below; the sixth segment comprises the FIFTH interval with the perfect qualification below and inside the segment; the seventh segment comprises the SIXTH interval grouping the minor/Major qualifications below and inside the sub-segments; the eighth segment comprises the SEVENTH interval grouping the minor/Major qualifications below and inside the sub-segment. The information contained in the other two bands is encompassed in twelve equal segments and arranged to match the notes written on the edge of the upper disk whatever the initial note designated by the FUNDAMENTAL/OCTAVE segment written on the lower disk.

I claim:

1. Device for composing, decomposing, retransposing and retranscribing all chords and scales contained in music and comprising two superimposed disks of different diameters joined at their centre by a pin enabling the disks to rotate independently; the device is characterized by a lower disk with a larger diameter, on whose outer edge is marked the sequence of notes of the diatonic scale A; A#/Bb; B; C; C#/Db; D; D#/Eb; E; F; F#/Gb; G; G#/Ab; the device features an upper disk with a smaller diameter divided into three bands by two concentric circles, the outer band indicates sequentially the sequence of intervals with their qualifications below, viz. the FUNDAMENTAL/OCTAVE interval; the SECOND interval with the minor, Major qualifications below; the THIRD interval with the minor, Major qualifications below; the FOURTH interval with the perfect qualification below; the FOURTH qualification with the augmented qualification below and the FIFTH interval with the diminished qualification below; the FIFTH interval with the perfect qualification below; the SIXTH interval with the minor, Major qualifications below; the SEVENTH interval with the minor, Major qualifications below, the middle band indicates abbreviations related to the scales, the inner band indicates degrees in numerical sequence from 1 to 14, the whole device is arranged so that each note of the lower disk is matched by information marked in the three bands of the upper disk and pertaining to chords, scales and degrees.

2. Device according to claim 1, in which the outer band of the upper disk is divided into eight segments spread as follows: four segments each comprising two sub-segments, the other four segments comprising a single sub-segment, suitably arranged as follows: the first segment comprises the FUNDAMENTAL interval with the OCTAVE below; the second segment comprises the SECOND interval with the minor, Major qualifications below and inside the sub-segments; the third segment comprises the THIRD interval with the minor, Major qualifications; the fourth segment comprises the FOURTH interval with the perfect qualification below and inside the sub-segment; the fifth segment comprises the intervals FOURTH with the augmented qualification below and FIFTH with the diminished qualification below; the sixth segment comprises the FIFTH interval with the perfect qualification below and inside the sub-segment; the seventh segment comprises the SIXTH interval with the minor, Major qualifications below and inside the sub-segments; the eighth segment comprises the SEVENTH interval with the minor, Major qualification below the sub-segments.

3. Device according to claim 1, in which the middle band of the upper disk is divided into twelve equal segments and comprises information related to the scales, the latter represented by abbreviations which provide markers indicating the distance between each note of the same scale.

4. Device according to claim 1, in which the inner band of the upper disk is divided into twelve equal segments and includes references to the degrees arranged in a numerical sequence from 1 to 14.

5. Device according to claim 1, in which each band of the upper disk is identified by a specific color.

6. Device according to claims 1 or 2, in which the segment comprising the FUNDAMENTAL/OCTAVE interval marked in the outer band of the upper disk has a distinct colour.

7. Device for composing, decomposing, retransposing and retranscribing all chords and scales contained in music, comprising two superimposed disks of different diameters joined at their center by a pin enabling the disks to rotate independently; device featuring an upper disk of smaller diameter on the outer edge of which are written the notes of the diatonic scale A; A#/Bb; B; C; C#/Db; D; D#/Eb; E; F; F#/Gb; G; G#/Ab and by a lower disk of larger diameter whose clearly visible periphery is divided into three bands by two concentric circles; the device featuring a lower disk whose outer band is divided into eight segments spread as follows: four segments each comprising two sub-segments and four other segments each comprising a single sub-segment, qualifications being written in the sub-segments with the sequence of intervals above; the middle and lower bands are divided into twelve equal segments, the middle band comprising abbreviations related to the scales and the inner band comprising degrees in numerical sequence from 1 to 14.

* * * * *